H. MORTENSEN, Sr.
WATER POWER SYSTEM.
APPLICATION FILED OCT. 6, 1920.
1,386,069.
Patented Aug. 2, 1921.
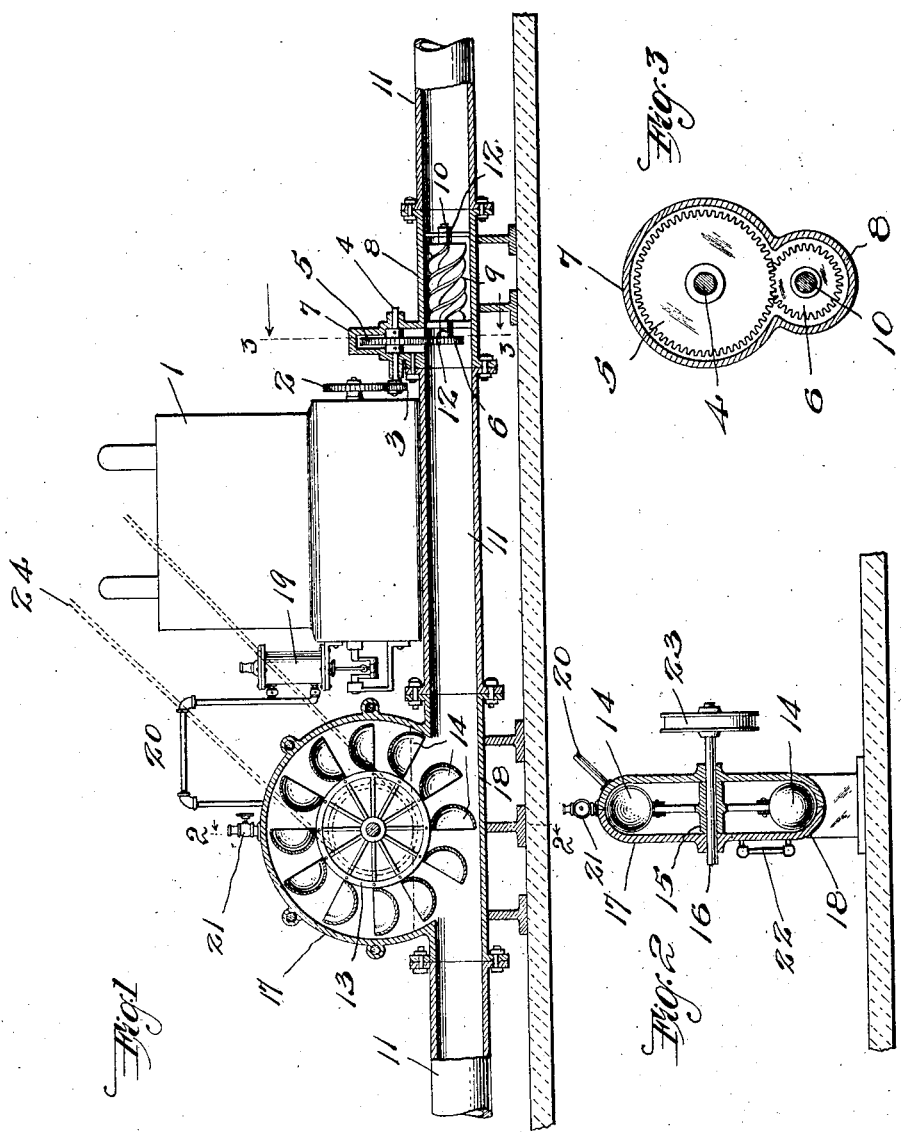
INVENTOR.
H. Mortensen Sr.
BY
Fenelon B. Brock
ATTORNEY.

UNITED STATES PATENT OFFICE.

HANS MORTENSEN, SR., OF PENROSE, COLORADO.

WATER-POWER SYSTEM.

1,386,069.   Specification of Letters Patent.   Patented Aug. 2, 1921.

Application filed October 6, 1920. Serial No. 415,129.

*To all whom it may concern:*

Be it known that I, HANS MORTENSEN, Sr., a citizen of the United States, residing at Penrose, in the county of Fremont and State of Colorado, have invented certain new and useful Improvements in Water-Power Systems, of which the following is a specification.

My present invention relates to improvements in water power systems designed especially for the purpose of developing and transmitting power for applied use. The invention consists essentially in the utilization of a prime mover for impelling confined water through a channel or duct whereby the flow of water is employed to operate a motor by means of which the power is developed and transmitted to its destination for use.

The invention further consists in certain combinations and arrangements of parts involving the construction of the impeller and motor as will be hereinafter pointed out and claimed.

In the accompanying drawings I have illustrated one complete example of the physical embodiment of my invention wherein the parts are combined and arranged according to the best mode I have thus far devised for the practical application of the principles of my invention.

As shown the water power system is capable of application for either marine propulsion, for other forms of locomotion, or may be used in connection with a stationary power plant.

Figure 1 is a longitudinal, vertical, sectional view, with some parts in side elevation, of the appliance embodying my invention.

Fig. 2 is a transverse vertical sectional view of the motor, at line 2—2 in Fig. 1.

Fig. 3 is an enlarged transverse sectional view at line 3—3 in Fig. 1 showing the gearing between the prime mover and the water impeller.

In Fig. 1 of the drawings the prime mover 1 is indicated in conventionalized form, and may employ steam, electricity, gas or other power for operating the water power system. By means of the train of gears 2 and 3 power developed in the prime mover is applied to the counter shaft 4 which has thereon the driving gear 5 meshing with a driven pinion 6. The gears are inclosed in a suitable housing 7 forming part of the tube section 8 in which the screw impeller 9 is journaled by means of its shaft 10, and the pinion 6 is keyed to this shaft to revolve therewith.

The tubular section 8 forms part of a duct or channel comprising pipes or tubular sections 11 through which water is impelled and caused to flow from a suitable source from left to right in Fig. 1.

By the operation of the impeller 9 as it revolves in its bearings 12 to its maximum speed the flow of water is accelerated to high speed as it rushes through the conduit or pipe, and the velocity of the water is utilized to operate a motor through the instrumentality of a water wheel 13.

The vertical water wheel 13 is of the undershot type having fixed buckets 14 at its periphery, which are approximately hemispherical in form, and its hub 15 is fixed on the wheel shaft 16 journaled in the motor housing 17. The housing is fashioned as a flat cylinder rising from the conduit section 18, and the buckets are ranged in position to travel successively through the section which conforms to the hemispherical shape of the buckets.

Three of the buckets are designed to occupy the conduit and receive the action of the flowing water as the latter is impelled from the advanced screw 9. Thus the flowing water impinges against the open face of the buckets, the center one of the three receiving the full force of the rushing currents and the front and rear buckets aiding in the rotary movement of the wheel.

The water fills the entire cross area of the conduit, and is permitted to rise to the level approximately indicated in the wheel housing by the dotted line in Fig. 1, thus insuring a submergence of the successive working buckets at all times.

To confine the water to its proper level in the wheel housing and thus enhance the efficiency of the motor, I utilize and introduce compressed fluid in the interior of the housing, above the water therein.

In Fig. 1 an air compressor or pump is indicated at 19 from which the compressed air pipe 20 extends to and communicates with the interior of the housing 17 at its upper portion, and by means of the pump a continuous and adequate supply of compressed air is furnished to the interior of the housing, to act as a cushion and retain the water at its predetermined level. A relief valve or pet cock 21 may be utilized when necessary to reduce the air pressure in the housing, and a gage glass 22 is provided to indicate the existing water level in the housing.

The modus operandi will be evident from the above description taken in connection with my drawings.

The flow of water through the conduit or tube 11 may be controlled by regulating means (not shown) and the action of the screw impeller, which is actuated from the prime mover or power device, draws a current of water through the conduit which current reaches the full capacity of the conduit. The flow of water reaches a high velocity and this steady and uniform current, impinging on the successive wheel buckets, revolves the motor wheel and its shaft 16 from which power may be taken through the pulley 23 on said shaft, and belt 24 indicated in dotted lines in Fig. 1, and applied as desired. Other transmission means may be utilized to take the power from the shaft, and the power developed and enhanced by the fluid or liquid currents and motor wheel may be applied for various purposes.

The motor wheel may be of predetermined leverage and the diameter of the cups or buckets may be determined in proportion thereto and to the size and velocity of the fluid current, to secure the highest proficiency of the power transmission.

I claim—

1. The combination with a prime mover, a closed conduit, and an impeller to cause water currents in the conduit, of a motor wheel having submerged buckets in the conduit and a housing over said wheel, and means for introducing fluid in said housing to maintain the proper water level therein.

2. The combination with a closed water conduit, a screw impeller therein and actuating means for said impeller, of an undershot water wheel having submerged buckets in said conduit, a housing for said wheel, and means for maintaining a predetermined water level in said housing.

3. The combination in a water power system with a prime mover, a closed conduit, and a screw impeller to cause water currents in said conduit, of an undershot water wheel having buckets submerged in said currents, a housing for the wheel open to the conduit, and means for introducing compressed air to said housing for maintaining a predetermined water level in said housing.

HANS MORTENSEN, Sr.